(12) United States Patent
Schlagman et al.

(10) Patent No.: US 11,643,126 B2
(45) Date of Patent: May 9, 2023

(54) FOLDABLE PUSH CHAIR

(71) Applicant: JIJIBABA LIMITED, London (GB)

(72) Inventors: Richard Schlagman, Locarno (CH); Björn Dahlström, Saltsjö-Duvnäs (SE)

(73) Assignee: JIJIBABA LIMITED, London (GB)

( * ) Notice: Subject to any disclaimer, the term of this patent is extended or adjusted under 35 U.S.C. 154(b) by 0 days.

(21) Appl. No.: 17/277,449

(22) PCT Filed: Sep. 17, 2019

(86) PCT No.: PCT/IB2019/000775
§ 371 (c)(1),
(2) Date: Mar. 18, 2021

(87) PCT Pub. No.: WO2020/058754
PCT Pub. Date: Mar. 26, 2020

(65) Prior Publication Data
US 2021/0347401 A1 Nov. 11, 2021

(30) Foreign Application Priority Data

Sep. 18, 2018 (GB) .................................... 1815208
Dec. 21, 2018 (GB) .................................... 1821013

(51) Int. Cl.
*B62B 7/06* (2006.01)
*B62B 7/08* (2006.01)

(52) U.S. Cl.
CPC .............. *B62B 7/062* (2013.01); *B62B 7/086* (2013.01); *B62B 2205/003* (2013.01); *B62B 2205/22* (2013.01); *B62B 2205/24* (2013.01)

(58) Field of Classification Search
CPC ... B62B 7/062; B62B 7/086; B62B 2205/003; B62B 2205/22; B62B 2205/24
See application file for complete search history.

(56) References Cited

U.S. PATENT DOCUMENTS 6,886,851 B2 * 5/2005 Chen ........................ B62B 7/10
280/47.38
7,481,443 B2 1/2009 Shim et al.
(Continued)

FOREIGN PATENT DOCUMENTS

CH 702892 A2 9/2011
CN 101104414 A 1/2008
(Continued)

OTHER PUBLICATIONS

International Search Report for International Application No. PCT/IB2019/000775 International Filing date Sep. 17, 2019; Report dated Jan. 20, 2020; 5 pages.
(Continued)

*Primary Examiner* — John D Walters
(74) *Attorney, Agent, or Firm* — Cantor Colburn LLP

(57) ABSTRACT

A foldable push chair comprises a central chassis assembly defining a central axis extending substantially perpendicularly to a normal direction of travel of the push chair, the push chair has at least three wheel supporting legs extending from the central chassis and rotatable about the central axis between a folded and unfolded state, in the unfolded state at least one wheel supporting leg extending in a forward direction and at least one wheel supporting leg extending in a rearward direction, the forwardly and rearwardly extending wheel supporting legs being coupled together such that they rotate in opposite directions around the central axis during a folding or unfolding operation, latching means engagable with at least one wheel supporting leg and the central chassis or handle assembly for ensuring the push chair can be latched in either or both of an unfolded state or a folded state, energy storage means associated with at least one wheel supporting leg and the central chassis or handle assembly, configurable to be loaded with energy either: a) when the push chair is changed from a folded state to an (Continued)

unfolded state, or b) when the push chair is changed from a unfolded state to a folded state; when the energy storage means is at least partially loaded with energy at least some of the energy stored in the energy storage means being used to assist in either: a) folding the push chair, or b) unfolding the push chair respectively when the latching mechanism is released.

14 Claims, 15 Drawing Sheets

(56) References Cited

U.S. PATENT DOCUMENTS

| | | | | |
|---|---|---|---|---|
| 8,087,689 | B2* | 1/2012 | Fritz | B62B 7/08 |
| | | | | 280/658 |
| 8,499,898 | B2* | 8/2013 | Thorne | B62B 7/062 |
| | | | | 188/20 |
| 2004/0183275 | A1 | 9/2004 | Chen | |
| 2006/0214395 | A1 | 9/2006 | Ageneau | |
| 2006/0267303 | A1 | 11/2006 | Golias | |
| 2006/0273552 | A1 | 12/2006 | Lan | |
| 2010/0025968 | A1 | 2/2010 | Fritz et al. | |
| 2011/0221169 | A1 | 9/2011 | Karremans et al. | |
| 2012/0112435 | A1 | 5/2012 | Kobayashi | |
| 2013/0147162 | A1 | 6/2013 | Hsu | |
| 2013/0234418 | A1 | 9/2013 | Reimers et al. | |
| 2014/0125038 | A1 | 5/2014 | Lin | |
| 2015/0307120 | A1 | 10/2015 | Sundberg et al. | |
| 2018/0001920 | A1 | 1/2018 | Li et al. | |
| 2019/0256120 | A1 | 8/2019 | Oakes | |

FOREIGN PATENT DOCUMENTS

| | | |
|---|---|---|
| CN | 105584513 A | 5/2016 |
| CN | 103359146 B | 6/2016 |
| CN | 105946952 A | 9/2016 |
| CN | 108407875 A | 8/2018 |
| EP | 0719693 A2 | 7/1996 |
| GB | 581540 A | 10/1946 |
| GB | 2426744 A | 12/2006 |
| GB | 2431381 A | 4/2007 |
| JP | H09263247 A | 10/1997 |
| WO | 2007134282 A2 | 11/2007 |
| WO | 2010028235 A1 | 3/2010 |

OTHER PUBLICATIONS

Written Opinion for International Application No. PCT/IB2019/000775 International Filing date Sep. 17, 2019; Report dated Jan. 20, 2020; 6 pages.

* cited by examiner

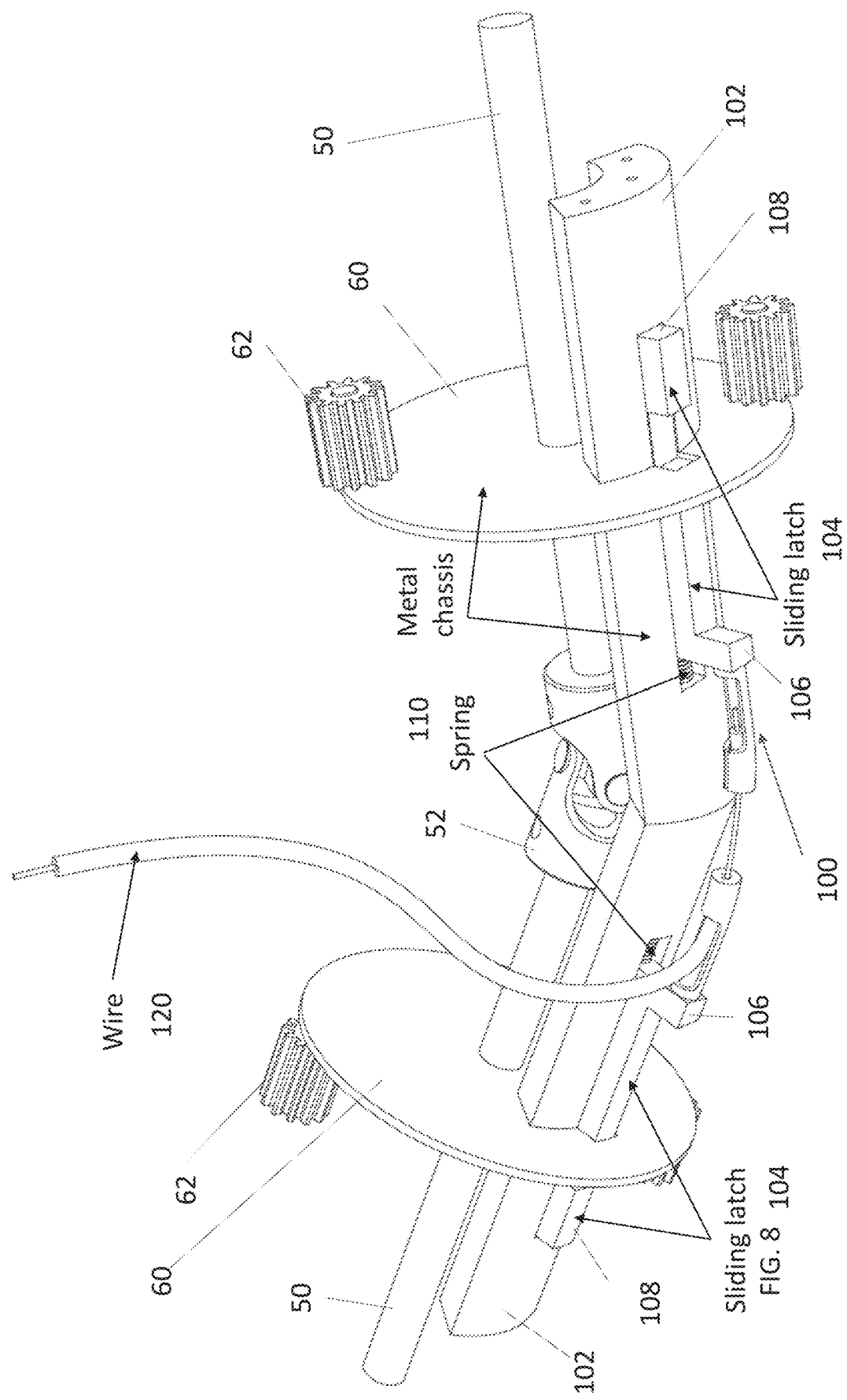

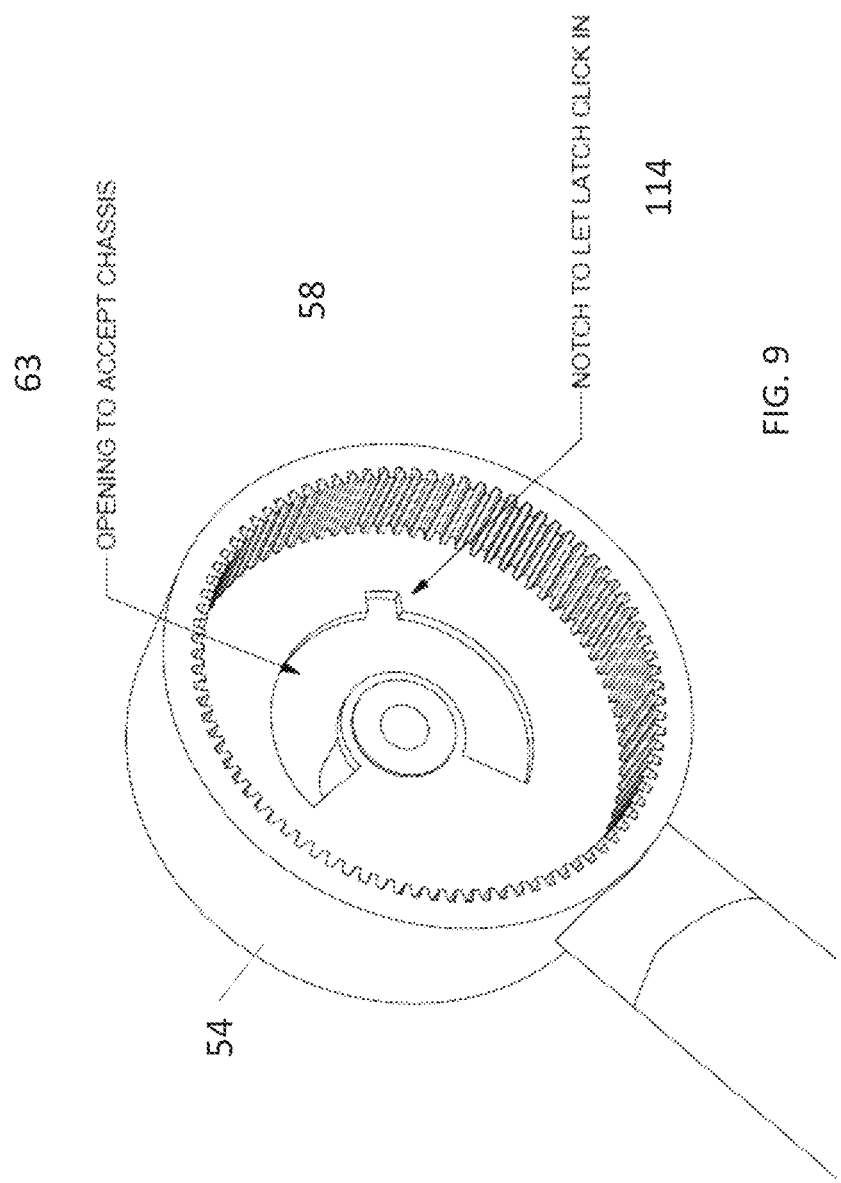

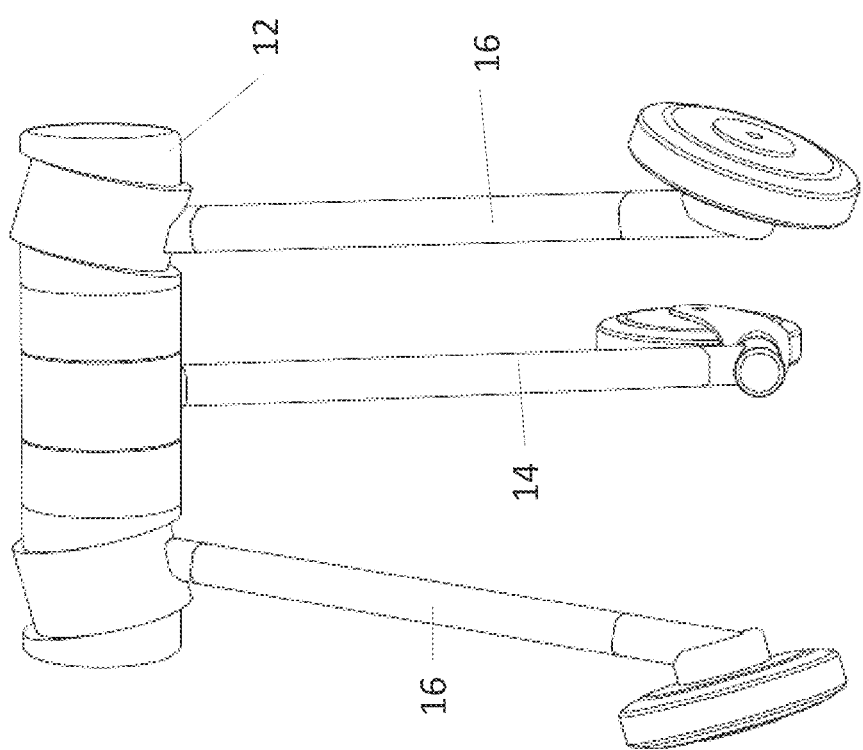

FOLDABLE PUSH CHAIR

CROSS REFERENCE TO RELATED APPLICATIONS

This application is a National Stage application of PCT/IB2019/000775, filed Sep. 17, 2019, which claims the benefit of GB Application No. 1821013.8, filed Dec. 21, 2018, and GB Application No. 1815208.2, filed Sep. 18, 2018, all of which are incorporated by reference in their entirety herein.

The present invention relates to a foldable push chair, and in particular one having means to store energy in order to assist with, depending upon the configuration, either the folding or unfolding process.

Push Chairs are well known for transporting small children and modern push chairs can also be used and adapted for the carriage of babies. In this application, the term push chair is intended also to include what are also commonly referred to as strollers or buggies and is also intended to describe a system comprising a chassis to which can be added a seat or a removable cot or other enclosure suitable for the transport of a baby or a small child. One of the desired features of a pushchair is that it can be folded to a compact dimension, so making it easier to carry, stow in a car or other transport means, such as a bus, train or aircraft.

Many pushchairs are known to fold and stow into smaller dimensions, most only fold into smaller sizes in one or two dimensions. Many examples can be found in the shops and in general use.

Foldable push chairs are well known and normally have to be manually folded and unfolded. This can be difficult, especially if the user is dealing with an infant at the same time. Whilst an electric motor could be employed to assist in the folding and unfolding, it will also require a battery and as a result the push chair will become larger, heavier and more expensive for a user to buy.

An objective of the present invention is to overcome at least some of the disadvantages of the prior art.

According a first aspect of the present invention there is provided a foldable push chair comprising a central chassis assembly extending substantially horizontally across the push chair and perpendicularly to the normal direction of travel of the push chair; a handle assembly connected to the central body and extending therefrom; a shaft assembly extending through the central chassis assembly across the push chair and substantially perpendicular to the normal direction of travel of the push chair, at least one forward extending wheel supporting leg and at least one rearward extending wheel supporting leg extending from the central chassis assembly and rotatable around an axis extending along a longitudinal axis of the shaft; the forward and rearward extending legs being coupled together such that they rotate in opposite directions around the shaft during a folding or unfolding operation, latching means engageable with at least one wheel supporting leg and the central chassis assembly or handle assembly for ensuring the push chair can be latched in either or both of an unfolded state or a folded state; energy storage means engaging with at least one wheel supporting leg and the central chassis assembly or handle assembly, the energy storage means being configurable to be loaded with energy either:

a) by changing the push chair from a folded state to an unfolded state, or b) by changing the push chair from an unfolded state to a folded state; when the energy storage means is at least partially loaded with energy at least some of the energy stored in the energy storage means being used to assist in either:

a) folding the push chair, or b) unfolding the push chair respectively, when the latching mechanism is released.

Advantageously, the push chair of the present invention can be easily changed between and folded and unfolded state because the forward extending and rearward extending wheel supporting legs are connected together such that they rotate in opposite directions around an axis extending along the length of the shaft in the chassis assembly and the energy storage means can be configured to assist either in folding or unfolding the push chair.

According to another aspect of the present invention there is provided a push chair the energy storage mechanism is a spring.

According to another aspect of the present invention there is provided a push chair in which the spring is a coil spring or a leaf spring.

According to another aspect of the present invention there is provided a push chair in which the coil spring comprises two ends, a first end engaging with a wheel supporting leg and a second end engaging with the central body assembly.

Advantageously, the two ends of the spring are held by parts of the push chair which rotate relative to one another during the unfolding or folding process and so the rotation during folding can be used to load the spring with energy which is used during an unfolding to assist the process. In an alternative configuration, the spring can be loaded with energy during the unfolding process in order for the stored energy to be used to assist the folding process.

In another embodiment of the present invention, there is a push chair in which the coil spring has two ends each extending tangentially away from a longitudinal axis of the coil.

In another embodiment of the present invention, there is provided a push chair in which the latching mechanism comprises a latching bar moveable between a latched position and an unlatched position in a slot in the central chassis assembly.

In one embodiment of the present invention, the energy storage means comprises a spring which is loaded with energy by the user when the push chair is changed from a folded to an unfolded state. The stored energy is then available to help fold the push chair more easily by release of a mechanical latch mechanism. The energy can be stored easily and easily recovered without the need for complex and expensive storage systems such as batteries.

In another embodiment of the present invention, the energy storage means comprises a spring which is loaded with energy by the user when the push chair is changed from an unfolded to a folded state. The stored energy is then available to help unfold the push chair more easily by release of a mechanical latch mechanism.

According to another aspect of the present invention there is provided a push chair in which the wheel supporting legs are maintained in the unfolded state by a latching mechanism.

According to another aspect of the present invention there is provided push chair in which the latching mechanism comprises a latching bar moveable between a latched position and an unlatched position in a slot in the central chassis.

Advantageously, the latching mechanism enables the push chair to be folded when the latching mechanism is released and use the benefits of the energy stored in the energy storage means to assist in the folding process.

According to another aspect of the present invention there is provided a push chair in which the latching bar is releasable by release means associated with the handle assembly.

According to another aspect of the present invention there is provided a push chair in which the latching bar is releasable by means of a cable associated with a release mechanism located in the handle assembly.

Advantageously, a latching mechanism release means located in the handle assembly enables a user to relatively easily release it and so ease and speed the process of folding the push chair.

According to another aspect of the present invention there is provided a push chair in which the latching bar is biased to a latched position.

Advantageously, with the latching mechanism biased to the latched position, the user can unfold the push chair and the latch will engage to lock the push chair in the unfolded position.

According to another aspect of the present invention there is provided a push chair in which the biasing means is a spring.

According to another aspect of the present invention there is provided a push chair in which the latching bar is provided with portions that engage with latching slots in the wheel supporting legs.

Advantageously, embodiments of the present invention provide a latching mechanism to enable the push chair to be latched in a folded or an unfolded state. Additionally, the biasing means associated with the mechanism will ensure the latching mechanism engages with the wheel supporting legs when they are in the correct locations.

The invention will now be described with reference to the accompanying drawings, in which:

FIG. 8 shows a view of an example of a type of latching mechanism used in the push chair;

FIG. 9 shows a detailed view of a wheel hub assembly used in conjunction with the latching mechanism;

FIG. 14 shows a folded version of the three wheel linear chassis of FIG. 13.

The push chair of the present invention will now be described in more detail with reference to the drawings.

Figure 1:
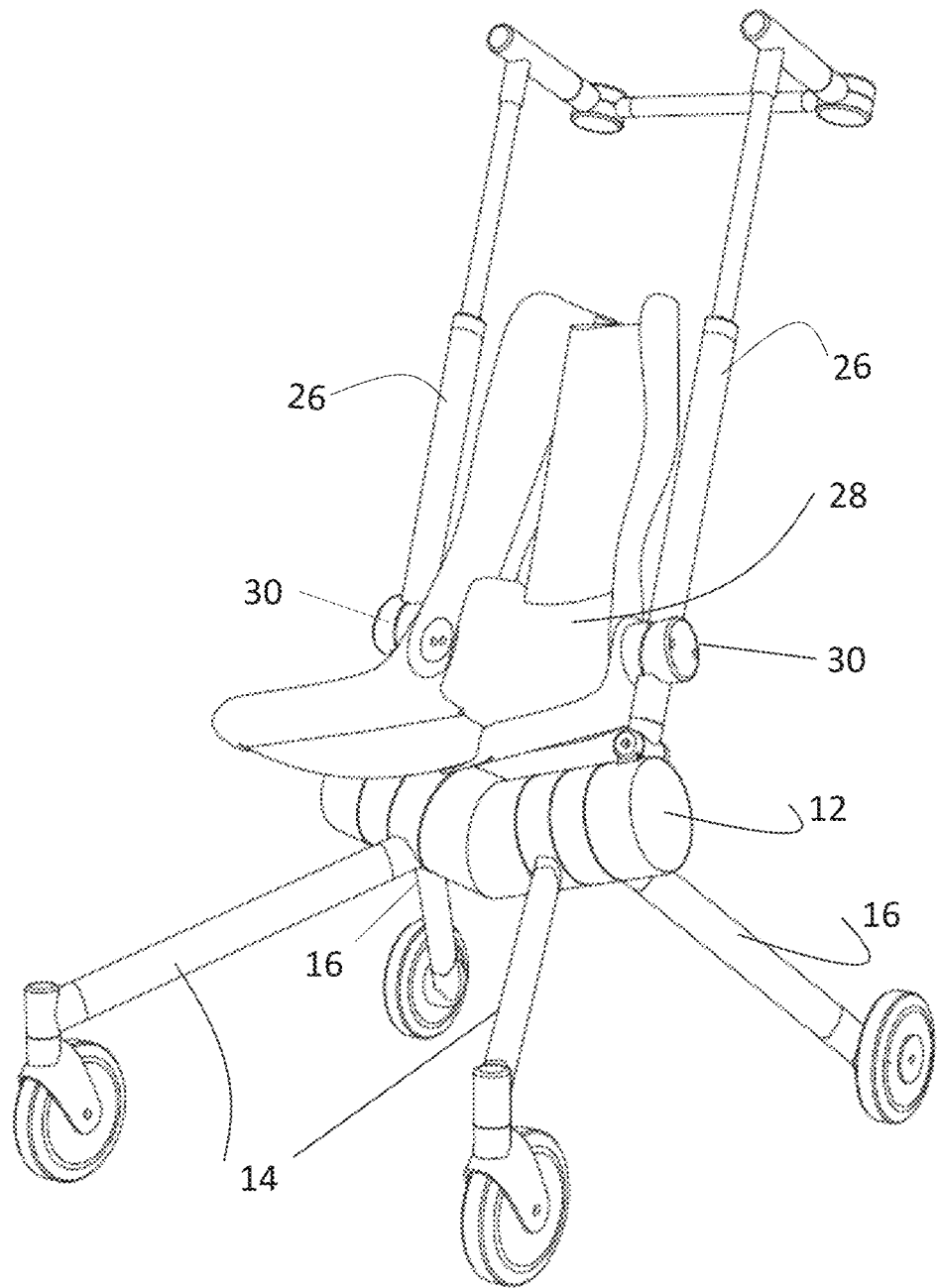
FIG. 1 shows a push chair according to the present invention in its unfolded state.

FIG. 1 shows a push chair according to the present invention in the unfolded state. The push chair 10 comprises a central chassis assembly 12, a forward extending leg 14 and a rearward extending leg 16 and a handle 26 all mounted on the central chassis assembly 12 and rotatable about an axis passing through the central chassis. A seat assembly 28 is mountable on the handle 26 by seat mounting means 30. As can be seen, normally the seat will be in a substantially upright position, but can be reclined at least partially. Alternatively, the seat could be replaced by a cot or other infant carrying assembly.

Figure 2:
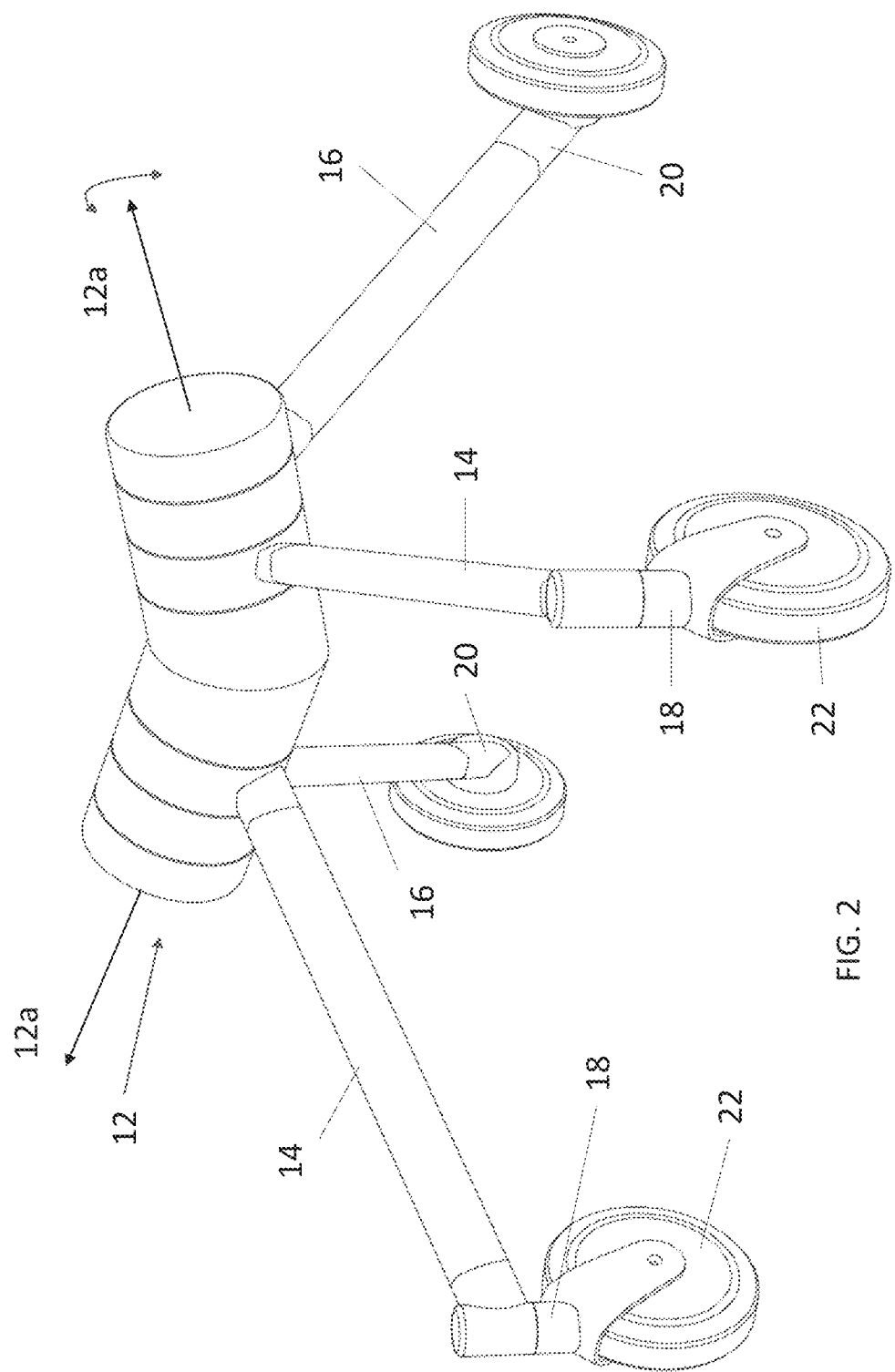
FIG. 2 shows a chassis of the push chair.

FIG. 2 shows the central chassis assembly 12, which in this embodiment is in the shape of a "V" with a forward extending leg 14 and a rearward extending leg 16 each extending from one arm of the V and a second forward extending leg 14 and a second rearward extending leg 16 extending from another arm of the V. For convenience and to help ensure clarity of the drawings, handle portions comprising the handle 26 which could be mounted on each arm of the V of the central chassis assembly 12 to facilitate the pushing and maneuvering of the push chair are not shown.

At distal ends of the forward extending legs 14 are front wheel assemblies 18 and at distal ends of rearward extending legs 16 are rear wheel assemblies 20. Normally the rear wheel assemblies are arranged so that rear wheels 24 can rotate about a generally horizontal axis. Front wheel assemblies 18 include front wheels 22 rotatable about a horizontal or substantially horizontal axis. Additionally, front wheel assemblies 18 are arranged so that front wheels 22 can rotate about a substantially vertical axis in order to increase the maneuverability of the push chair.

The central chassis assembly will also comprise a "V" shape, with one forward extending leg and one rearward extending leg located on each arm of the V. A particular advantage of the V shape of the chassis is that it facilitates the folding of the push chair assembly into a smaller volume than might be possible with other and known arrangements without compromising the strength of the unfolded push chair. More particularly, it enables the push chair of the present invention to be folded so that it is smaller in all three dimensions, so enabling it to be more easily stored or transported than other known push chairs.

Figure 3B:
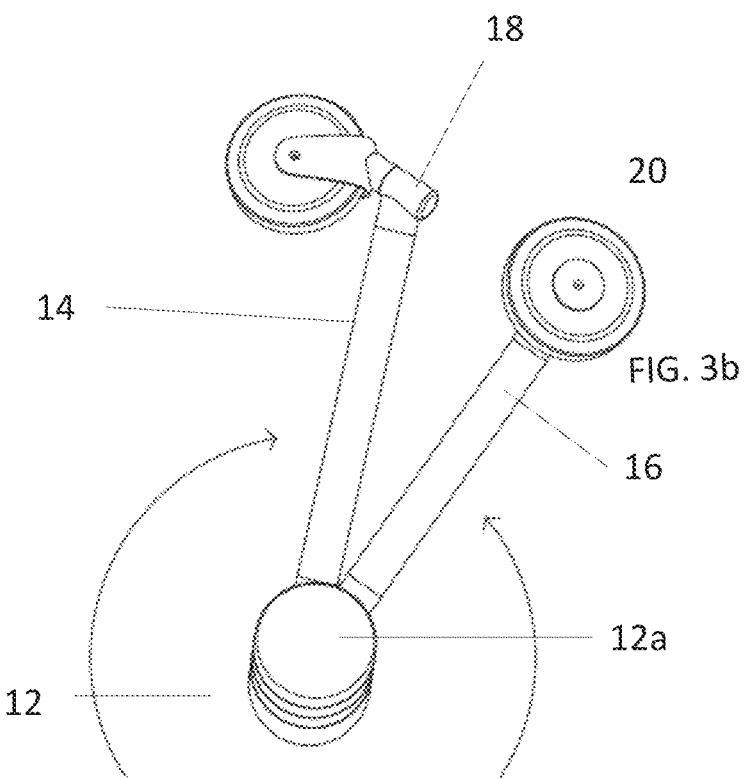
FIGS. 3a and 3b show how the legs of the push chair rotate around an axis between a folded and an unfolded state.
Figure 3A:
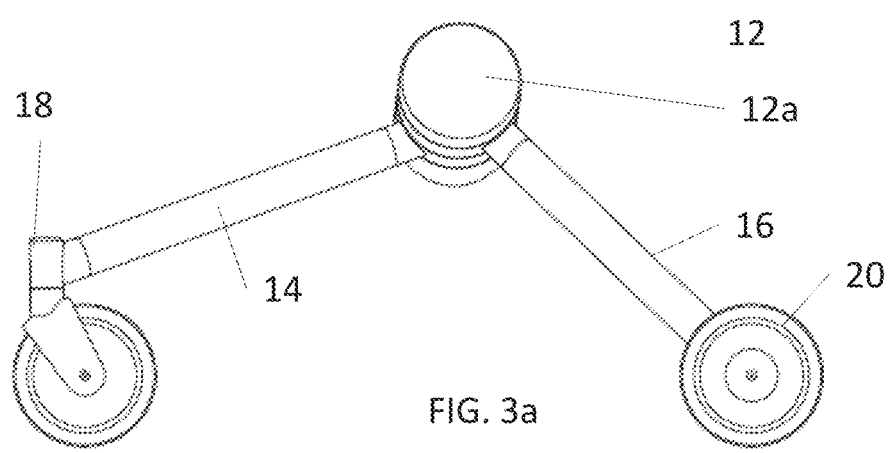

FIG. 3a shows one arm of the V shaped central chassis with the forward extending leg 14 and the rearward extending leg 16 in the unfolded position. FIG. 3b shows how the two legs can be rotated in opposite directions about an axis 12a to fold and form a compact folded arrangement.

Figure 4:
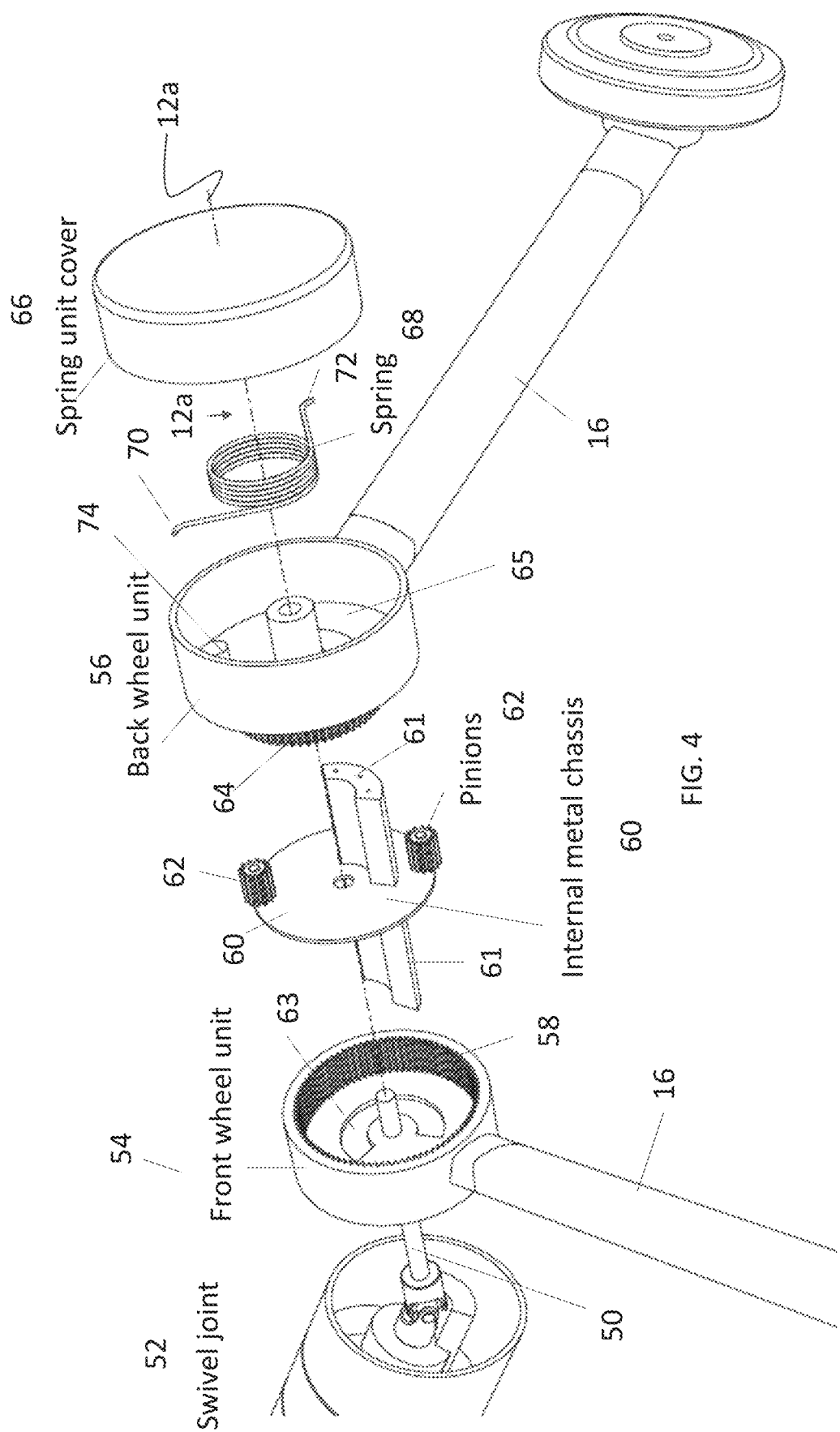
FIG. 4 shows a view of a gearing arrangement used in the push chair to ensure folding of the assembly.

FIG. 4 shows an expanded view of a gearing arrangement used in the push chair to couple the forward facing and rearward facing legs and ensure the operation of the folding of the chassis. This particular embodiment comprises an epicyclic gear assembly, detailed construction and operation of which is explained below. The figure shows the arrangement on one arm of the V shaped chassis, the same type of arrangement can be used on the other arm, but is not shown for the purposes of simplicity. The arm of the chassis encloses an axis of rotation 12a of the forward and rearward extending legs 14 and 16. A shaft 50 extends along the axis 12a. Shaft 50 is articulated and connected to a corresponding shaft in the other arm of the V by a universal swivel coupling 52. Whilst a universal swivel coupling is a convenient and well known means of coupling the two shafts in the arms of the chassis, other means can be used and envisaged. For example, the coupling could be a flexible elastomeric material attached to the ends of the shaft located in the central body region of the chassis assembly, or a device similar in construction to an automotive constant velocity joint or a tube of a woven metal mesh capable of transmitting torque.

Forward extending leg 14 has a hub portion 54 comprising the end of the leg 14 and is mounted on the shaft 50. The hub 54 is provided with internal spur gear teeth 58 comprising the annulus of the gear assembly. An internal chassis 60 is mounted on shaft 50. Planet gears 62 are rotatably mounted on the chassis so that they engage with the spur gear teeth 58 of the annulus. Rearward extending leg 16 also includes a hub portion 56 which is also mounted on the shaft 50. The hub portion 56 is provided with a set of external facing spur gear teeth 64 comprising the sun portion of the gear train which engage with the planet gears 62. The internal chassis 60 includes tongues 61 extending therefrom in a plane substantially parallel to the axis 12a, the tongues engaging in slots 63, 65 respectively in hubs 54 and 56 to limit the chassis 60 in its rotation with respect to the hubs.

It will be apparent that when assembled, the forward extending leg and rearward extending leg are connected by the epicyclic gear train so that as the push chair is folded or unfolded, the two legs will rotate in opposite directions as the chair is folded or unfolded. A cover unit 66 is provided at the end shaft 50 to protect the gear assembly. Preferably, the cover unit also provides a hub for mounting the handle 26 (not shown) which extends therefrom.

A further improvement to the push chair is provided by the addition of a spring 68, which, depending on the chosen configuration can be used to assist the folding or unfolding of the push chair. In this embodiment, the spring shown is a coil spring in which a longitudinal axis of the coil is parallel to, if not co-axial with, the axis 12a. The spring 68 has end parts 70, 72 which each extend away tangentially from the longitudinal axis of the coil to provide stabilising or mounting arms. One of the arms 70 engages with a retaining stop 74 in the hub 56, the other arm 72 engages in a retaining slot or hole 76 in cover assembly 66.

Figure 5:
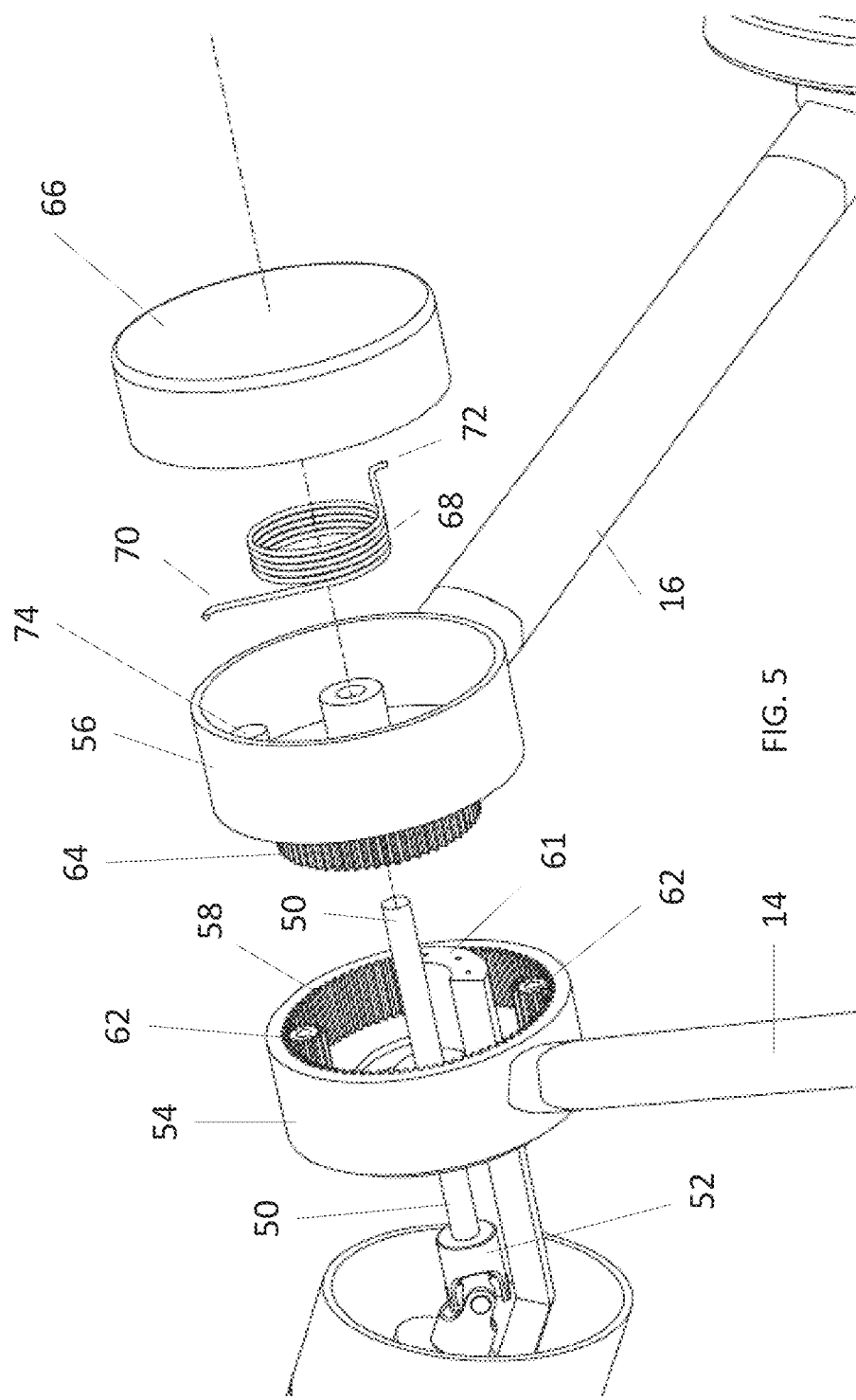
FIG. 5 shows a more detailed view of a gearing arrangement of FIG. 4.

FIG. 5 shows the chassis arm partially assembled with the internal chassis 60 located in the receiving slot in the front wheel hub 54.

Figure 6:
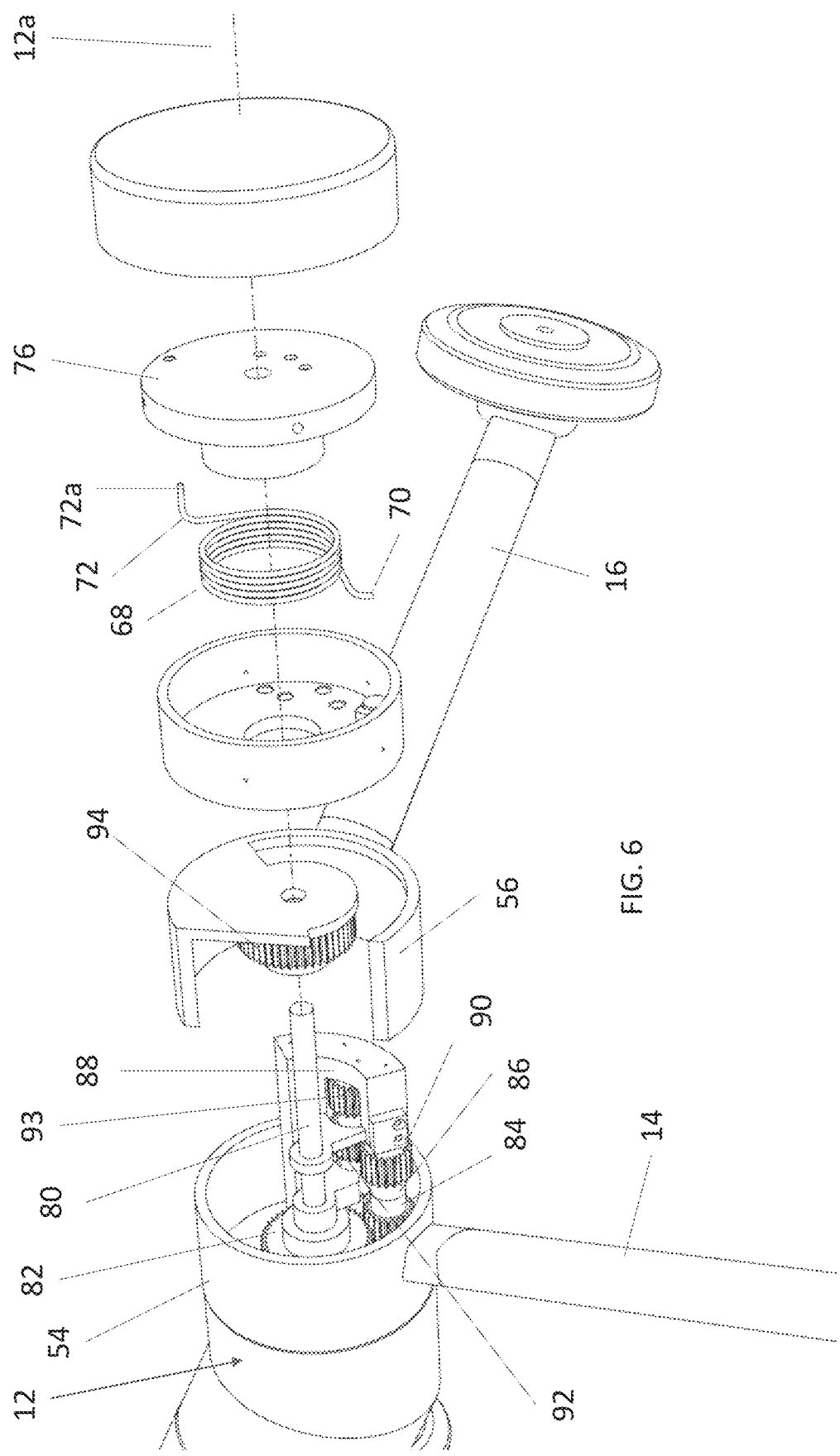
FIG. 6 shows an alternative gearing arrangement for the folding mechanism.

FIG. 6 shows a cut away drawing of an assembly using an alternative gearing arrangement comprising a main shaft and countershaft arrangement. Such types of gear systems are commonly found in many applications, such as automotive transmissions or gearboxes. In this case a main shaft 80 extends along the line defined by the axis 12a. A spur gear 82 is mounted on the mainshaft 80 and either secured to the hub portion 54 of the forward extending leg 14 or forms an integral part of it. Spur gear 82 in turn engages with a countershaft gear 84 mounted on a countershaft 86 (also known as a lay shaft) supported in a countershaft chassis 88. Countershaft 86 is supported by and extends through the chassis 88 and includes a second countershaft spur gear 90 which in turn engages with an idler gear 92 on an idler shaft (not shown separately). The idler shaft is also supported in the countershaft chassis. A second idler gear 93 is also mounted on the idler shaft and engages with a second spur gear 94 connected to the hub 56 of the rearward extending leg 16. By this arrangement, rotation of the forward extending leg 14 causes the countershaft gear 84 to be rotated about its axis and in the opposite direction to the rotating leg. This motion is transmitted through the countershaft and any gears mounted thereon to the idler gears 92 and 93 which are caused to rotate in the opposite direction. The idler gear 93 is in turn engaging with second spur gear 94 in the hub 56 of the rearward extending leg 16 and so caused to rotate in the opposite direction to the rotation of the idler gear. By the use of the transmission system, the rotation of one wheel supporting leg, say a forward extending wheel supporting leg, in one direction causes the other wheel supporting leg connected to the gearing system, in this case a rearward extending wheel supporting leg, to rotate in the opposite direction. Advantageously, the forward extending and rearward extending legs are on the same axis, so presenting a very compact arrangement for the chassis.

For the purposes of construction, it is a matter of convenience and constructor's preference whether the main shaft is connected to the hubs of the forward or rearward extending legs and which gear is connected to the idler gears; the operation and result is the same.

Figure 7:
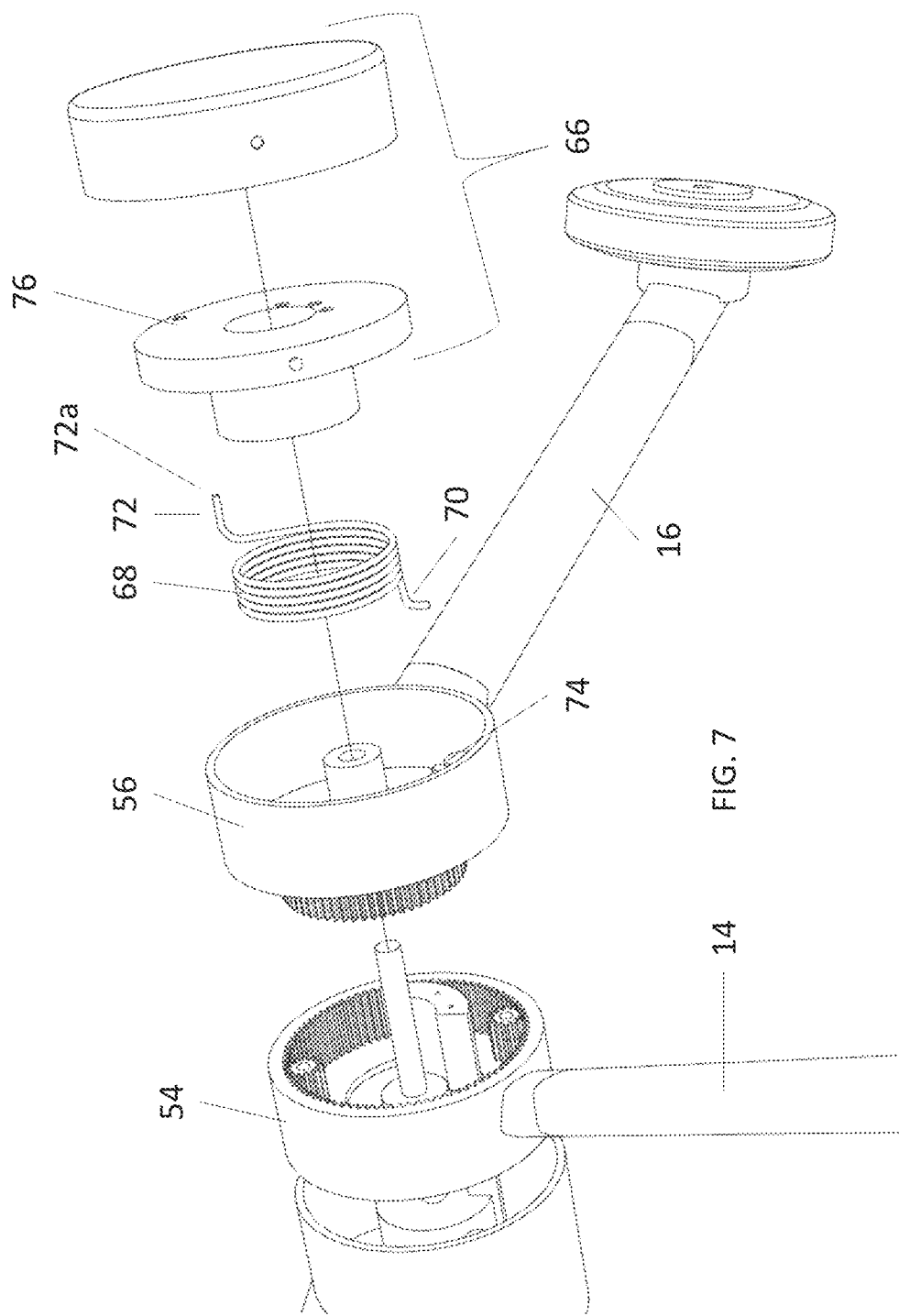
FIG. 7 shows in more detail an arrangement for the incorporation of a spring mechanism to facilitate the folding or unfolding of the push chair.

FIG. 7 shows in more detail an arrangement for the incorporation of a spring mechanism to facilitate the folding of the push chair. The spring 68 comprises a coil body having two ends each extending tangentially away from a longitudinal axis defined by the coil of the spring. A first end 70 engages with a stop incorporated into the hub assembly 56. A second end of the spring has a leg 72 extending tangentially from the body of the coil, ending in a finger 72a extending in a direction parallel to the axis of the coil spring, said finger 72a engageable with a slot or hole 76 in the spring cover assembly 66. Thus, when both ends of the spring are engaged with their respective restraining means, the spring is not able to rotate but can be "wound up" and so used to store energy to assist with the folding of the push chair.

As the push chair is unfolded, rotation of the wheel supporting legs about the axis extending through the shaft to unfold the push chair results in energy being put into the spring. When the push chair is folded, at least some of the energy stored in the spring is then released and used to help fold the push chair into its compact dimensions.

In operation as the push chair is unfolded the spring is loaded with energy. When it reaches its fully unfolded position the wheel supporting legs are locked in place by means of a latching mechanism. When desired, the latching mechanism may be released to allow the push chair to be folded. Preferably, release means for the latching mechanism is in the form of a button or a lever located on the handle assembly.

Alternatively, the spring can be configured and anchored with respect to the chassis and the wheel supporting legs so that as the push chair is folded, energy is stored in the spring and retained in the spring until the push chair is unfolded, when at least some of the energy can be used to assist in unfolding the push chair.

FIG. 8 shows an embodiment of a latching mechanism 100. In this example, both arms of the V forming the chassis are shown. Central shafts 50 extend along each arm of the "V" shaped chassis 12 and in a central region of the chassis are joined by universal swivel coupling 52. Extending parallel to the axis 12a is a latching mechanism supporting frame 102. Formed in the support frame 102 is a channel in which a sliding latch bar 104 is locatable. The sliding latch bar 104 has a main body part with raised latching portions 106, 108 at or near its ends. Raised latching portions 106, 108 are proud of the channel in the frame 102 in which the bar is slidably located. Raised latching portions 106, 108 engage with latching slots in the hub portions 54 and 56 of the forward and rearward extending legs respectively, not shown here for reasons of clarity. It will be readily apparent that a single latching mechanism could be used, extending along only one of the arms of the V, however, the benefits of two latching mechanisms will be readily apparent in the extra safety and redundancy provided.

FIG. 9 shows a close-up view of front hub 54. The slot 63 receives the internal chassis 60. Also, a hub locking slot 114 in the form of a notch can be seen for receiving raised latching portion 106. When raised latching portion 106 is engaged with the hub locking slot 114, the hub is no longer able to rotate about the axis 12a, and so is locked in place. A similar arrangement is provided for the rearward extending leg 16 and hub assembly 56. It can thus be seen that the legs are locked and unable to rotate with respect to each other and so the push chair in maintained in an unfolded state. Although not shown, a similar arrangement of notches can be provided for latching the push chair in a folded state.

Operation of the release and engagement of the latching mechanism will now be described with reference to FIG. 8. The latching bar 104 must be moved so the raised portions 106, 108 clear the slots 114 and 116 in the front and rear hubs 54 and 56. Normally, the latching bar is retained in place by means of a biasing mechanism. This is achieved in the present invention by means of a coil spring 110 located in the channel of the support frame 102. In this embodiment, an end of latching bar 104 is connected to a first end of a flexible cable 120, the cable extending away from the chassis to a second end at a convenient location, such as on the handle where it can be connected to a release lever or button. By pulling the cable 120, the latching bar 104 is moved by sliding motion against the biasing force of the spring 110 along the channel in the support frame 102 to move the raised latching portions 106, 108 out of engagement with the latching slots 114, 116 in the hubs 54, 56, so enabling the spring 68 to exert a force on the hubs 56, 58 to rotate them around the axis 12a and so assist in folding the push chair.

When the push chair is being unfolded, the hubs 54, 56 rotate around axis 12a and raised latching portions 106, 108 will be urged to engage with the latching slots 114, 116 in the hubs 54, 56 by the biasing means 110 to lock the push chair in the unfolded state.

Figure 9B:
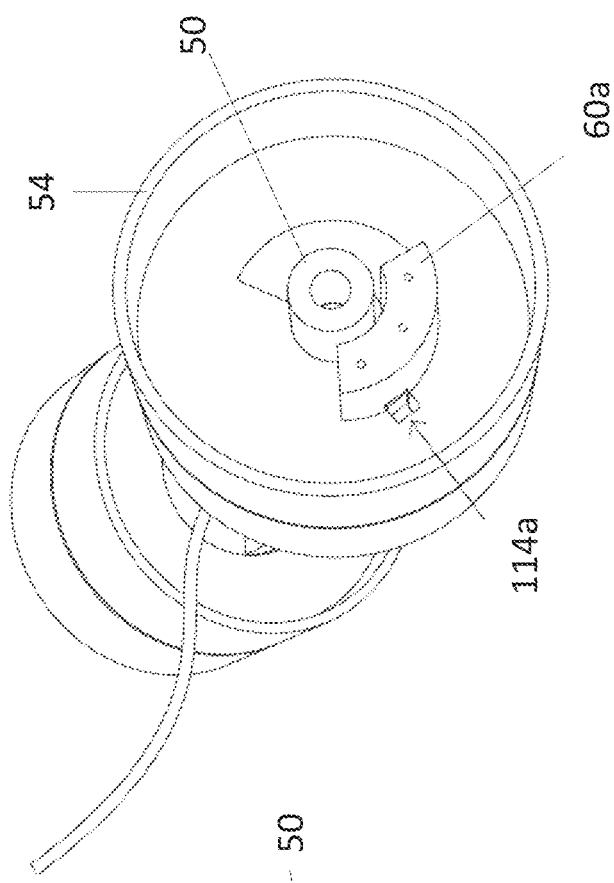
FIGS. 9a and 9b show an alternative configuration for a latching mechanism.
Figure 9A:
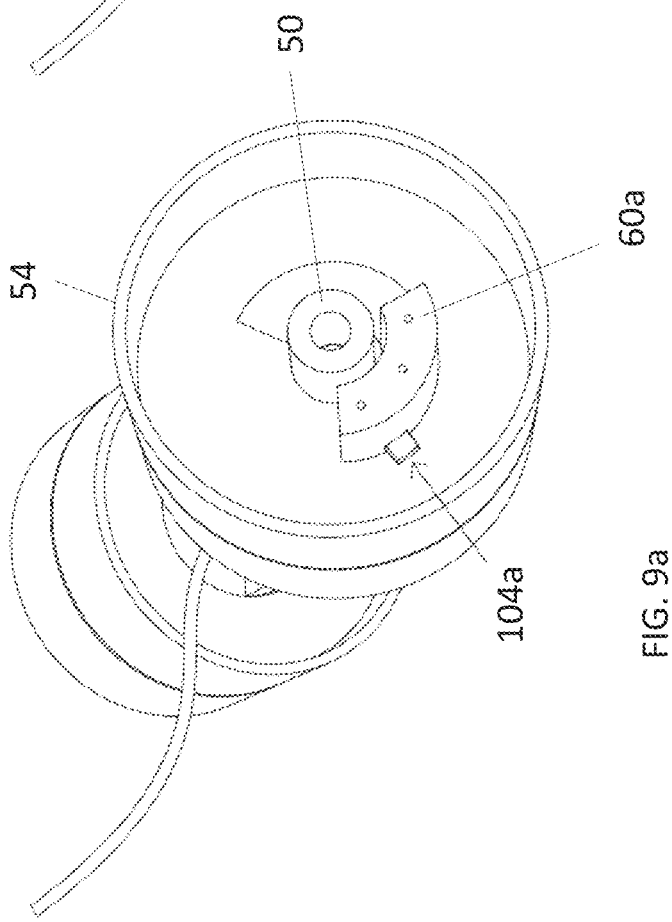

FIGS. 9a and 9b show an alternative configuration for a latching mechanism. In this example, the latching mechanism operates radially, with a latching pin moving radially in and out of engagement with shaft 50. Latching pin 104a in supported in an internal chassis 60a such that it may move radially in and out of engagement with the central shaft 50.

Figure 10:
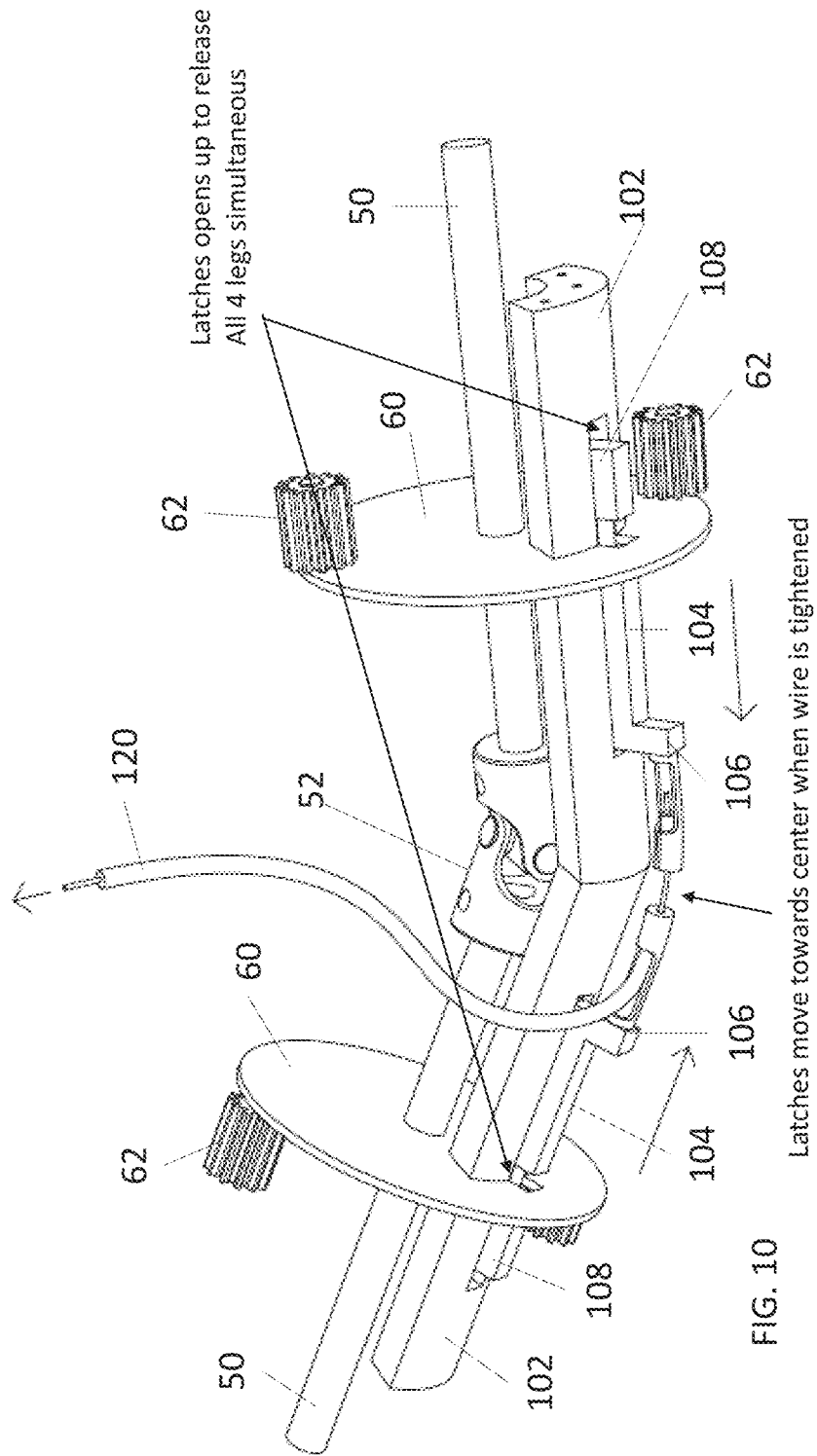
FIG. 10 shows the latching mechanism in its released position.

FIG. 10 shows the position of the latch bar 104 when the cable 120 is under tension and the biasing spring 110 is compressed. As can be seen, the raised latching portions 106, 108 of the latching bar are moved so disengaging them from the latching slots 114, 116 in the hubs 54, 56.

By coupling the cable to each arm of the V shaped chassis it is possible to operate the latching arrangement on both arms simultaneously, so ensuring that all four legs of the push chair rotate simultaneously.

It may be desirable to apply some chamfering to the latching portions 106, 108 in order to provide a smoother and easier engagement with the latching slots in the hubs. Alternatively, or additionally, the slot 114, 116 in the hub 54, 56 may be chamfered.

The latching mechanism illustrated in FIGS. 8 and 10 is one which operates parallel to the axis of the shafts 50 and so can be made to have compact dimensions, however, it will be readily appreciated that other forms and configurations of latching mechanism could be designed, for example to operate in a radial direction in relation to the shafts 50.

The operation of the energy storage means has been described to provide assistance to the folding of the push chair, however it will be readily appreciated that the operation of the energy storage means could relatively easily be configured to provide energy to assist in unfolding the push chair. This can be achieved by configuring the spring and its retaining means in a different manner. For example, the spring could be retained on the other side of the retaining stop 74. Alternatively, the spring could be coiled in the opposite direction. Clearly, a number of alternatives can be easily envisaged.

Figure 11:
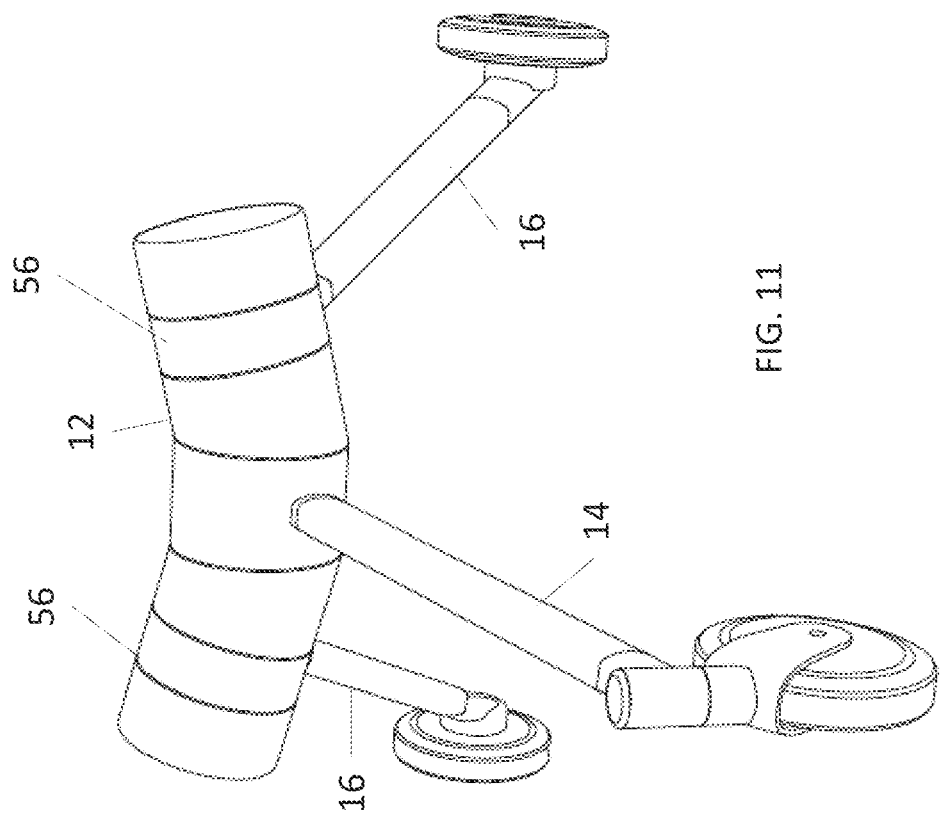
FIG. 11 shows an example of a three wheel chassis, having one forward extending and two rearward extending legs.

Whilst the description and drawings have shown a four wheeled push chair, embodiments can readily be envisaged in which the push chair comprises only three wheels; the configuration most regularly used is that of three wheels with one forward extending leg supporting a wheel and two rearward extending legs supporting two rear wheels. An example is shown in FIG. 11. In this type of embodiment, the universal swivel coupling can be replaced either by two universal couplings, each connected to a central shaft supporting the single central wheel assembly. Alternatively, the universal coupling could be replaced by one or more sets of bevelled pinion gears on the ends of shafts 50 and engaging with a central shaft upon which is mounted a forward extending leg.

Figure 12:
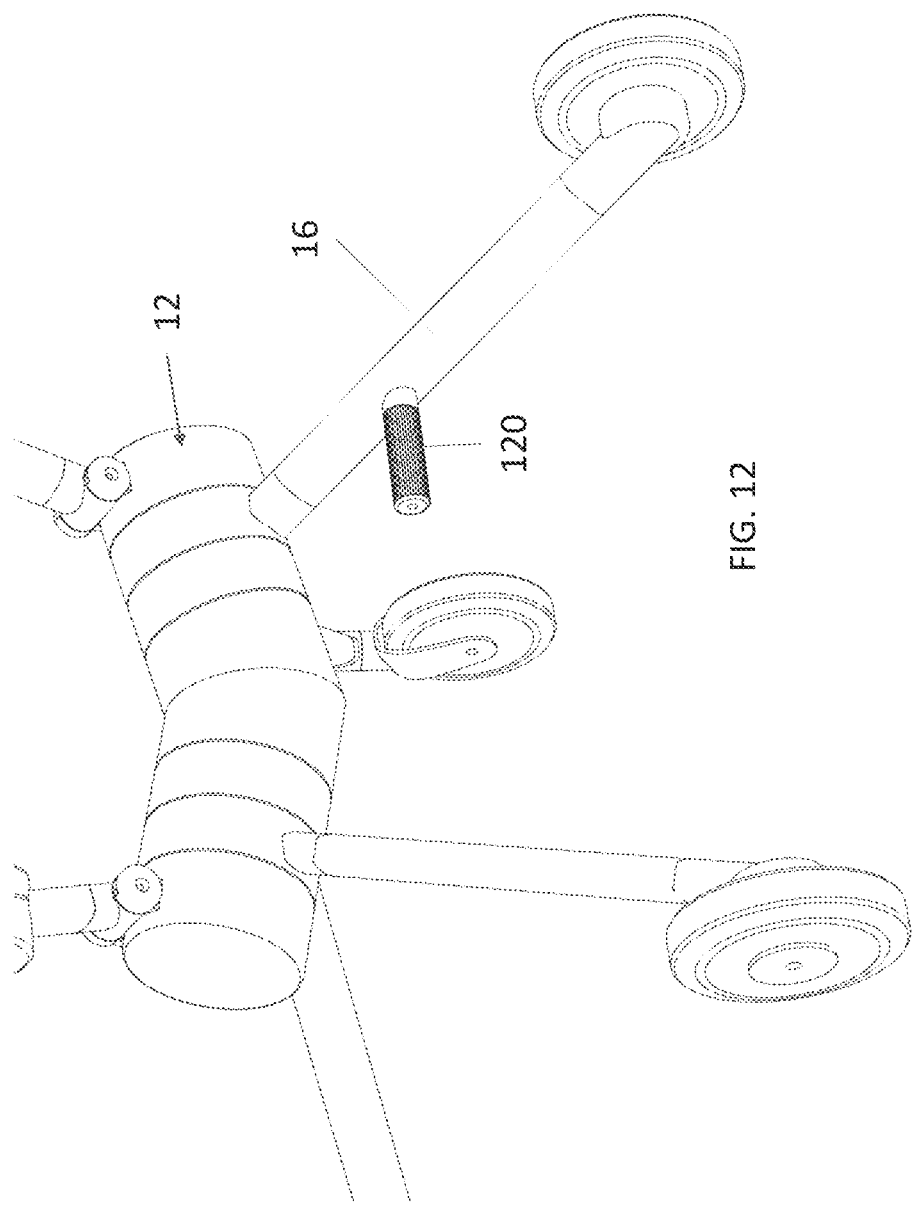
FIG. 12 shows an example of a step or pedal which may be used to help a user unfold the push chair.

In order to assist a user in the unfolding operation of the push chair, a pushing step or pedal 120 may be provided on one of the rearward extending legs. An example is shown in FIG. 12.

Figure 13:
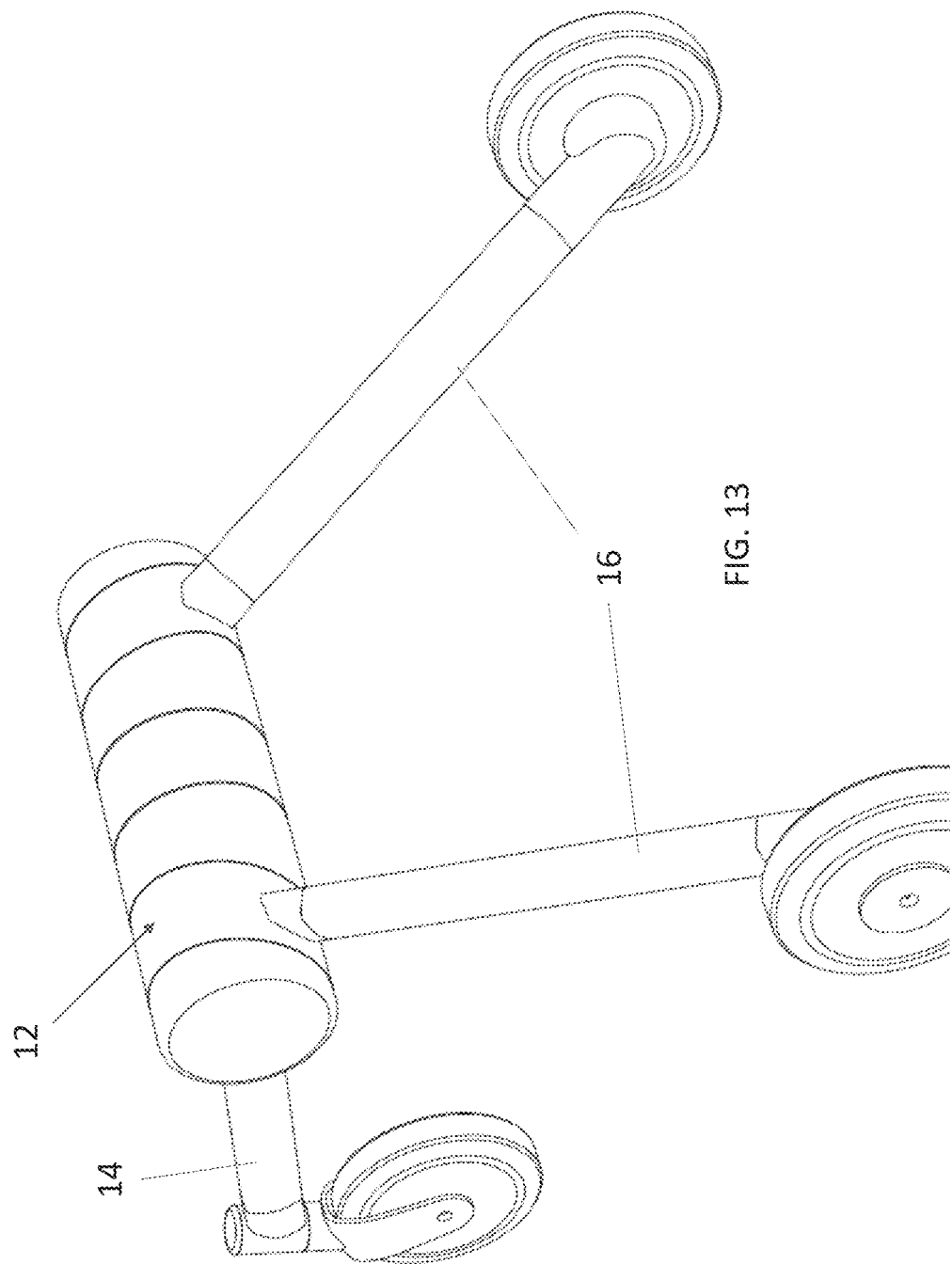
FIG. 13 shows an arrangement with a push chair chassis having a linear chassis and three wheels.

FIG. 13 illustrates another alternative embodiment in which the V shaped chassis is replaced by a linear chassis having a single linear axis. In this illustration, the handle and seat assembly are not shown for convenience, but could be attached as illustrated in other embodiments. In this embodiment, swivel or universal joints or couplings would not be required. The forward extending legs would each be mounted on one of a pair of co-axial shafts connected and rearward extending legs would be mounted on the other shaft, the co-axial shafts connected together by gearing mechanisms of the type described above in order to ensure the legs rotate in opposite directions during a folding and unfolding operation. The energy storage means could be incorporated in the gear system as already described. Alternatively, it may be possible or convenient to have only one gear system in a three wheel push chair.

FIG. 14 shows the chassis of FIG. 13 folded to its compact dimensions. It will be readily apparent to the skilled reader that the chassis can incorporate an energy storage system as described above to assist in either folding or unfolding a push chair, according to the chosen configuration of the energy storage system.

Also, it will be apparent that different latching mechanisms could be provided. These could for example be incorporated into the handle assembly.

The invention claimed is:

1. A foldable push chair comprising a central chassis assembly extending substantially horizontally across the push chair and perpendicularly to the normal direction of travel of the push chair; a handle assembly connected to the central body and extending therefrom;

a shaft assembly extending through the central chassis assembly across the push chair and substantially perpendicular to the normal direction of travel of the push chair, at least one forward extending wheel supporting leg and at least one rearward extending wheel supporting leg extending from the central chassis assembly and rotatable around an axis extending along a longitudinal axis of the shaft assembly;

the forward and rearward extending legs being coupled together such that they rotate in opposite directions around the central chassis assembly or the forward and rearward extending legs being coupled together such that they rotate in opposite directions around the shaft assembly during a folding or unfolding operation, latching means engageable with at least one wheel supporting leg and the central chassis assembly or handle assembly for ensuring the push chair can be latched in either or both of an unfolded state or a folded state;

energy storage means engaging with at least one wheel supporting leg and the central chassis assembly or handle assembly, the energy storage means being configurable to be loaded with energy either:
  a) by changing the push chair from a folded state to an unfolded state, or
  b) by changing the push chair from an unfolded state to a folded state;

when the energy storage means is at least partially loaded with energy at least some of the energy stored in the energy storage means being used to assist in either:

folding the push chair, or b) unfolding the push chair respectively when the latching mechanism is released.

2. A push chair according to claim 1, in which the energy storage mechanism is a spring.

3. A push chair according to claim 1 in which the spring is a coil spring or a leaf spring.

4. A push chair according to claim 3, in which the coil spring comprises two ends, a first end engaging with a wheel supporting leg and a second end engaging with the central body assembly.

5. A push chair according to claim 4 in which the coil spring has two ends each extending tangentially away from a longitudinal axis of the coil.

6. A push chair according to claim 1 in which the latching mechanism comprises a latching bar moveable between a latched position and an unlatched position in a slot in the central chassis assembly.

7. A push chair according to claim 1 in which the latching bar is releasable by release means associated with the handle assembly.

8. A push chair according to claim 1 in which the latching bar is releasable by means of a cable associated with a release mechanism located in. the handle assembly.

9. A push chair according to claim 1 in which the latching bar is biased to a latched position.

10. A push chair according to claim 9 in which the biasing means is a spring.

11. A push chair according to claim 1 in which the latching bar is provided with portions that engage with latching slots in the wheel supporting legs.

12. A push chair according to claim 1, wherein the at least one of the rearward and one of the forward extending legs are arranged to rotate in opposite directions about a common axis.

13. he push chair according to claim 1, in which the one or more forward extending wheel supporting legs and the one or more rearward extending wheel supporting legs are coupled together such that they rotate in opposite directions around the central chassis assembly or the one or more forward extending wheel supporting legs and the one or more rearward extending wheel supporting legs are coupled together such that they rotate in opposite directions around the shaft assembly, during a folding operation to a closed position adjacent the handle assembly of the pushchair.

14. The push chair according to claim 13, in which the wheels are arranged to engage with a ground surface when in the open position and the one or more forward extending wheel supporting legs and the one or more rearward extending wheel supporting legs are coupled together to rotate upwards away from ground surface to the closed position.

* * * * *